May 5, 1964 W. J. VANDERSTEEG 3,131,585

BORING CUTTERS

Filed Aug. 1, 1962

*INVENTOR.*
WILLIAM J. VANDERSTEEG
BY
Barlow & Barlow
ATTORNEYS

United States Patent Office 3,131,585
Patented May 5, 1964

3,131,585
BORING CUTTERS
William J. Vandersteeg, Lansing, Ill., assignor to Madison Industries Inc., a corporation of Michigan
Filed Aug. 1, 1962, Ser. No. 213,991
1 Claim. (Cl. 77—58)

This invention relates to an improved cutter assembly for use with boring bars and is a continuation-in-part of my application, Serial No. 158,243, filed December 11, 1961, now abandoned.

Basically, boring bars have assumed a standard configuration of a bar having a transverse opening to receive a cutter assembly. The cutter assembly may either be configured to a roughing cutter or to a reaming cutter. In any event the cutter is retained in the bar by means of a centering pin which is pressed against the cutter received within the opening, the cutter being provided with at notch to receive the end of the centering pin. To enable the cutter assembly to be adjusted to compensate for wear, it is quite usual to have two complemental blades which may slide relatively one to the other. When it is desired to ream a hole, the cutter asembly is permitted to float radially in the bar, the centering pin extending between two edges of a notch and not being tightened against the assembly. In roughing cutter use, however, the centering pin is frequently tightened against walls of the notch in the cutter assembly. The cutter assemblies wear after a certain amount of use and the cutting edge thereof must be reground. During the regrinding operation to sharpen the cutting edge, stock is removed so that the diameter of the cutter assembly has been reduced by the amount of stock that has been removed. It is necessary, therefore, to expand the cutter assembly to the previous diameter, and the two blades of the cutter assembly are adjusted relative to each other to the previous diameter. The common practice in the industry has been to grind the notch into which the centering pin is received in the cutter assembly when it has been adjusted to the size required when the cutter assembly is new. It will be appreciated, therefore, that when the cutter assembly is sharpened and readjusted, the notch will effectively become smaller. Under most circumstances a single sharpening of the cutting edges will not require any dressing up of the notch, but after two or more sharpening operations have occurred, it is also necessary to increase the size of the notch by grinding out a larger section thereof or the centering pin will not engage the side walls of the notch. It would, accordingly, be desirable to eliminate the regrinding operation for the notch, and it is therefore the main object of this invention to improve upon the cutter assembly used in boring bars, and a more particular object of the invention is to provide a notch construction in cutter assemblies which will minimize the regrinding of the notch during the life of the cutter assembly.

With these and other objects in view, the invention consists of certain novel features of construction as will be more fully described and particularly pointed out in the appended claims.

Figure 1:
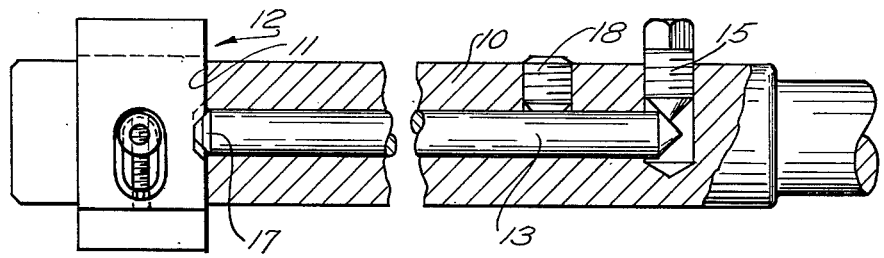
FIG. 1 is an elevational view partly in section of an assembled boring bar with a cutter assembly received therein.

Referring now to the drawings, 10 designates a boring bar which has a transverse opening 11 to receive the cutter assembly generally designated 12. In order to retain the cutter assembly 12 in position, there is provided a centering pin 13 that is longitudinally disposed on the axis of the bar 10 in a suitable bore, the centering pin 13 being adapted to move axially along this bore. A tapered screw such as 15 is adapted to act on the tapered end 16 of the centering pin 13 to impart longitudinal movement to the centering in 13, and the opposite end of the centering pin 13 is provided with a chamfered end as at 17. The cutter assembly 12 is notched as will be more particularly described below, and as briefly alluded to above, the bevel of the centering pin 13 will generally tightly engage the side walls of the notch, binding the cutter firmly in the boring bar 10 for roughing cutting operations. For light reaming cuts, the end 17 of the centering pin does not bottom or engage the side walls of the notch of the cutter assembly 12 but permits movement of the cutter in the slot 11 laterally of the bar 10. In this fashion the cutter floats with the centering pin 13 loose between the side walls of the notch and the cutter finds its own center in the work that is being operated upon. The adjustment of the centering pin is, of course, had by the screw 15 and the position of the centering pin 13 may be fixed after adjustment by a set screw 18.

Figure 6:
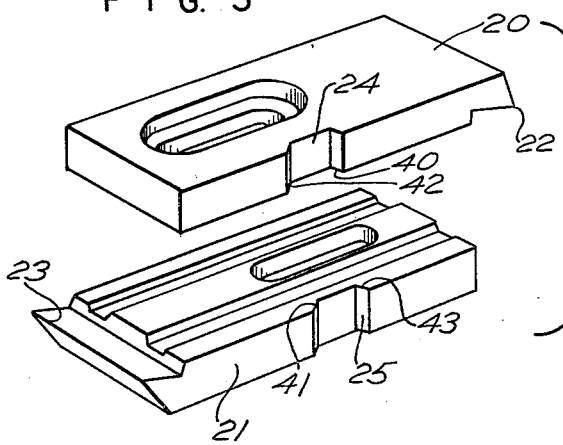
FIG. 6 is a detached perspective view of top and bottom blades of a reaming cutting assembly with the notches of the present invention.

In order to understand the special notch construction which is disclosed by the instant invention, it would be well to first refer to FIG. 6, where a reaming cutter is disclosed, and this consists of substantially two equally dimensioned rectangular blades 20 and 21 which are provided with cutting edges 22 and 23 respectively. These blades are maintained in alignment one with the other by means of mating surfaces formed with V-ways and flats which form no subject of the instant invention and may be adjusted relative one to the other by screw adjusting means which are well known to those versed in the art.

Figure 4:
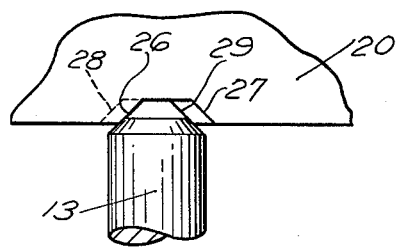
FIGS. 4 and 5 are similar views to those of FIGS. 2 and 3 with the cutter assembly in a different position.
Figure 5:
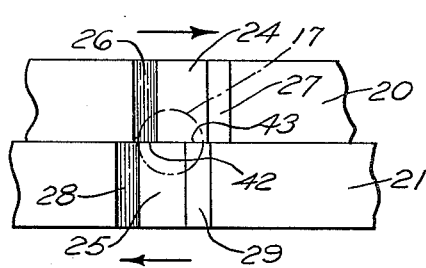

The notches which have been referred to above in connection with the cutter assembly are the notches 24 and 25 which are provided on the cutters 20 and 21 respectively. Notch 24 has chamfered ends 26, 27 and notch 25 has chamfered ends 28, 29. It has been the general practice to form these notches as the last operation in the manufacturing of reaming cutters, and to this end the reaming cutters are completely ground and set up to the customer's required dimension, as an example for a two-inch reaming cutter, the edges 22 and 23 would be 2.000 inches apart. In this position the central point between the edges 22 and 23 would be ascertained and the notches 24 and 25 would be ground therein while the cutter is in assembled relationship. It is apparent that as soon as the reaming cutter has been resharpened and the blades readjusted to the cutting diameter, the relative position of the notches will move, and a condition such as is illustrated in FIGS. 4 and 5 will result with a consequent narrowing of the notch. Shown in FIG. 5 in phantom is the chamfered end 17 of the centering pin 13, and it is apparent that in the showing of FIGS. 4 and 5 there is just room to receive this chamfered end between the walls 26 and 29 of the notch to roughly align the cutter assembly 12 within the boring bar 10. When the cutter assembly needs to be reground after substantial use, the next regrinding will require a repositioning of the blades 20 and 21 to a point so that the chamfered end 17 of the centering pin 13 will not enter the notch. To alleviate this situation, it is necessary therefore to grind off the edge 26 of the notch 24 and the edge 29 of the notch 25, and this regrinding of the edges of the notches will have to be repeated on each subsequent sharpening of the edges 22 and 23 of the reaming cutters. From a practical manufacturing standpoint it is obvious that more downtime will be experienced when several portions of a cutter assembly need to be reground in order to place it back into service again. Thus we can experience the downtime necessary not only for the sharpening of the cutting edges 22 and 23 but also the downtime necessary to enlarge the notches 24 and 25.

Figure 2:
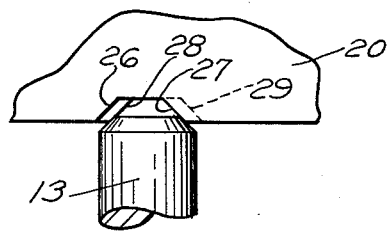
FIG. 2 is a fragmental view on an enlarged scale of the blade notch and engagement of the chamfered end of the centering pin therein.

The present invention tends to obviate some of these difficulties, and to this end the notches 24 and 25 are not ground into an assembled cutter but are placed in the individual cutting blades before assembly. The notches are formed on the individual cutting blades centrally offset with respect to the length of the blade at a point remote from the cutting edges 22 and 23 more than one half of the blade length. Depending upon a variety of factors the precise position may vary somewhat. However, the assembled cutter when adjusted to its proper cutting diameter at time of delivery from the factory will have a pair of notches reversely offset (FIGS. 2 and 3) so as to present a pair of juxtapositioned edges which will loosely engage the chamfered end 17 of the centering pin for reaming operations. The edges which are referred to would be the edges 40 and 41 which are found at one end of the walls 27 and 28, respectively (see FIGS. 2 and 3). These edges are closest to the cutting edges 22, 23 in each blade. Then if the cutter need be resharpened, the blade 20 will move to the right as viewed in the drawing with blade 21 moving to the left. It will be apparent that during this movement the chamfered end 17 of the centering pin, represented by the broken line 32, will always loosely engage the edges 40 and 41 until the notches 24 and 25 obtain alignment, at which time the centering pin end 17 would make some point contact with the walls 27, 29 and 26, 28. This is a condition, however, that is rarely obtained, and thus as the notches are further adjusted to the position of FIG. 5, a contact will now be made between the edges 42 and 43 of the notches 24 and 25, respectively, and this condition will continue until these edges are so close together that none of the chamfered end 17 may contact these edges.

Figure 3:
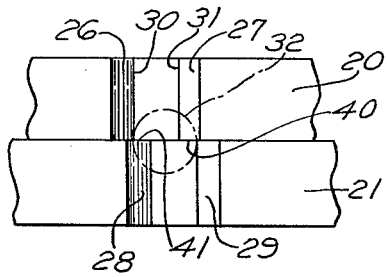
FIG. 3 is an end view with the parts in the same attiude as they are in FIG. 2.

Purely by way of example of one method of practicing the invention, each of the notches 24 and 25 may be formed with a bottom width between the inner edges 30, 31 of the walls 26, 27 much smaller than the face diameter of the chamfered end 17 which is represented by the broken line 32 in the drawing (FIG. 3). Further the walls 26, 27 rising from the edges 30 and 31 may be inclined at an angle of 45° to the bottom face 35 of one notch as may be the walls 28, 29 relative to the bottom face 36 of the other notch. If the end 17 of the centering pin 13 has a diameter of $15/64$ of an inch (.2343″) which is chamfered down from a $3/8$ of an inch rod, the bottom of the notch may be formed with a base dimension of $3/16$ of an inch, and if the inclined side walls extend to a depth of $1/8$ of an inch, the entrance dimension of the notch in each blade will be .437 inch or $7/16$. Further as alluded to above, the location of the notches 24 and 25 as related to the body length of each of the blades 20 and 21 is offset, body length being the length of the cutter along the interfitting portions of each blade. In practice it has been found that if the center line of the notch is made .078 inch from the center line of the body length, a very workable arrangement results.

To illustrate the advantages secured by this construction, let us assume that we have a cutter diameter of two inches. It is standard in this size of cutter to have a maximum cutter adjustment of $5/8$ of an inch, and under old standards, it would have been necessary to regrind the notch nine times during this $5/8$ of an inch adjustment. However, under the construction presented herewith, it is only necessary to regrind the notch twice during the entire $5/8$-inch travel of the two cutters relative one to the other.

I claim:

A boring tool comprising a boring bar having a transverse cutter receiving slot and provided with an axial bore communicating with said slot, a centering pin disposed in said bore and adapted to move therealong, said pin having a chamfered end, a pair of cutter blades disposed in said slot, each blade interfitting with the other along the body length of the cutter assembly and having overhanging cutting edges, each blade being provided intermediate its ends with a notch having inclined walls and a bottom wall, the center of each of said notches being in a position centrally offset along the body length from the cutting edge, each notch having an entrance width equal to or slightly larger than the diameter of the centering pin, the bottom width of said notch being smaller than the smallest diameter of the chamfered end of said pin to prevent bottoming of the centering pin, whereby maximum axial travel of the centering pin is secured.

References Cited in the file of this patent

UNITED STATES PATENTS

| 2,408,891 | Steiner | Oct. 8, 1946 |
| 2,680,390 | Chapman | June 8, 1954 |
| 2,742,800 | Miller | Apr. 24, 1956 |
| 3,030,829 | Gordon | Apr. 29, 1962 |